(12) United States Patent
Zhuge et al.

(10) Patent No.: US 9,768,875 B2
(45) Date of Patent: Sep. 19, 2017

(54) OPTICAL MODULATION SCHEMES HAVING REDUCED NONLINEAR OPTICAL TRANSMISSION IMPAIRMENTS

(71) Applicants: Qunbi Zhuge, Kanata (CA); Michael Andrew Reimer, Stittsville (CA); Shahab Oveis Gharan, Nepean (CA); Maurice O'Sullivan, Ottawa (CA)

(72) Inventors: Qunbi Zhuge, Kanata (CA); Michael Andrew Reimer, Stittsville (CA); Shahab Oveis Gharan, Nepean (CA); Maurice O'Sullivan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 147 days.

(21) Appl. No.: 14/644,320

(22) Filed: Mar. 11, 2015

(65) Prior Publication Data

US 2015/0195045 A1    Jul. 9, 2015

Related U.S. Application Data

(63) Continuation-in-part of application No. 13/969,694, filed on Aug. 19, 2013, now Pat. No. 9,143,238.
(Continued)

(51) Int. Cl.
*H04B 10/00* (2013.01)
*H04B 10/04* (2006.01)
(Continued)

(52) U.S. Cl.
CPC ....... *H04B 10/532* (2013.01); *H04B 10/2557* (2013.01); *H04B 10/5055* (2013.01); *H04B 10/61* (2013.01); *H04B 10/564* (2013.01)

(58) Field of Classification Search
CPC combination set(s) only.
See application file for complete search history.

(56) References Cited

U.S. PATENT DOCUMENTS 3,831,096 A * 8/1974 Brown, Jr. .............. H04L 27/24
327/158
6,081,221 A * 6/2000 Zrnic ...................... G01S 13/95
342/118
(Continued)

OTHER PUBLICATIONS

Bülow, "Polarization QAM Modulation (POL-QAM) for Coherent Detection Schemes", Alcatel-Lucent. Bell Labs, OSA/OFC/NFOEC 2009, Stuttgart, Germany, pp. 1-3.
(Continued)

*Primary Examiner* — Ken N Vanderpuye
*Assistant Examiner* — Jai Lee
(74) *Attorney, Agent, or Firm* — Integral Intellectual Property Inc.; Miriam Paton; Amy Scouten (57) ABSTRACT

A method of transmitting a data signal using an optical transmitter of an optical communications system. The optical transmitter is configured to modulate an optical carrier in successive signalling intervals to generate an optical signal. A modulation scheme is provided which comprises a multi-dimensional symbol constellation. The modulation scheme is designed such that an average degree of polarization of a modulated optical signal output from the optical transmitter has a first value when averaged across a first signalling interval, and has a second value when averaged across more than one and fewer than 100 signalling intervals. The second value is less than 10 percent of the first value. During run-time, an encoder of the optical transmitter encoding a data signal to be transmitted as symbols of the constellation, and a modulator of the optical transmitter modulating available dimensions of the optical carrier in accordance with the symbols.

20 Claims, 9 Drawing Sheets

Related U.S. Application Data (60) Provisional application No. 61/725,221, filed on Nov. 12, 2012.

(51) Int. Cl.
*H04B 10/532* (2013.01)
*H04B 10/2557* (2013.01)
*H04B 10/50* (2013.01)
*H04B 10/61* (2013.01)
*H04B 10/564* (2013.01)

(56) References Cited

U.S. PATENT DOCUMENTS

| | | | |
|---|---|---|---|
| 7,340,001 B2 * | 3/2008 | Smith | H04B 14/004 342/361 |
| 7,409,163 B2 * | 8/2008 | Gill | H04B 10/25137 398/147 |
| 8,270,847 B2 | 9/2012 | Zhang et al. | |
| 8,995,834 B2 * | 3/2015 | Krongold | H04J 14/06 398/205 |
| 2003/0175033 A1 * | 9/2003 | Taga | H04J 14/06 398/152 |
| 2005/0123061 A1 | 6/2005 | Smith et al. | |
| 2006/0270449 A1 * | 11/2006 | Kim | H04B 1/034 455/552.1 |
| 2007/0166046 A1 * | 7/2007 | Hecker | G02B 6/272 398/154 |
| 2007/0291834 A1 * | 12/2007 | Toumazou | H04B 1/7176 375/239 |
| 2009/0052907 A1 | 2/2009 | Batshon et al. | |
| 2009/0235143 A1 | 9/2009 | Djordjevic et al. | |
| 2010/0067902 A1 | 3/2010 | Sun et al. | |
| 2010/0211849 A1 | 8/2010 | Djordjevic et al. | |
| 2011/0150505 A1 * | 6/2011 | Roberts | H04B 10/60 398/208 |
| 2011/0305457 A1 * | 12/2011 | Kikuchi | H04B 10/5055 398/65 |
| 2011/0305461 A1 | 12/2011 | Eiselt | |
| 2012/0076235 A1 | 3/2012 | Dou et al. | |
| 2012/0207470 A1 | 8/2012 | Djordjevic et al. | |
| 2012/0263466 A1 | 10/2012 | Djordjevic et al. | |
| 2012/0263467 A1 | 10/2012 | Cvijetic et al. | |
| 2012/0307933 A1 | 12/2012 | Djordjevic et al. | |
| 2012/0308233 A1 * | 12/2012 | Hironishi | H04B 10/611 398/65 |
| 2013/0163988 A1 * | 6/2013 | Krongold | H04B 10/6971 398/65 |
| 2013/0336649 A1 * | 12/2013 | Essiambre | H04L 27/06 398/27 |
| 2014/0003813 A1 | 1/2014 | Pfau et al. | |
| 2014/0029957 A1 | 1/2014 | Sethumadhavan et al. | |
| 2014/0079394 A1 | 3/2014 | Xie et al. | |
| 2014/0099128 A1 * | 4/2014 | Mateo | H04B 10/6163 398/158 |
| 2014/0314366 A1 | 10/2014 | Yamazaki et al. | |
| 2016/0344482 A1 * | 11/2016 | Zhuge | H04B 10/564 |

OTHER PUBLICATIONS

Agrell, et al., "Power-Efficient Modulation Formats in Coherent Transmission Systems", Journal of Lightwave Technology, vol. 27, No. 22, Nov. 15, 2009, pp. 5115-5126.

Batshon, et al., "Beyond 240 Gb/s per Wavelength Optical Transmission Using Coded Hybrid Subcarrier/Annplitude/ Phase/Polarization Modulation", IEEE Photonics Technology Letters, vol. 22, No. 5, Mar. 1, 2010, pp. 299-301.

Noe, PLL-Free Synchronous QPSK Polarization Multiplex/Diversity Receiver Concept with Digital I&Q Baseband Processing, IEEE Photonics Technology Letters, vol. 17, No. 4, Apr. 2005, pp. 887-889.

Ip et al., "Coherent Detection in Optical Fiber Systems", Stanford University, pp. 1-38.

Krongold, Brian; Pfau, T.; Kandeda, N.; Lee, S.C.J., "Comparison Between PS-QPSK and PDM-QPSK with Equal Rate and Bandwidth," Photonics Technology Letter, IEEE, vol. 24, No. 3, pp. 203, 205, Feb. 1, 2012.

Magnus Karlsson and Erik Agrell, "Which is the most power-efficient modulation format in optical links?," Opt. Express 17, 10814-10819 (2009).

Martin Sjödin, Pontus Johannisson, Henk Wymeersch, Peter A. Andrekson, and Magnus Karlsson, "Comparison of polarization-switched QPSK and polarization-multiplexed QPSK at 30 Gbit/s," Opt. Express 19, 7839-7846 (2011).

* cited by examiner

| Frame | SYMBOL | | | | | | | | | | | | | | | |
|---|---|---|---|---|---|---|---|---|---|---|---|---|---|---|---|---|
|  | A | B | C | D | E | F | G | H | I | J | K | L | M | N | O | P |
| X1 | 1+j | 1-j | 0 | 0 | 0 | 0 | -1+j | -1-j | 1+j | 1-j | 0 | 0 | 0 | 0 | -1+j | -1-j |
| Y1 | 0 | 0 | 1+j | -1+j | 1-j | -1-j | 0 | 0 | 0 | 0 | 1+j | -1+j | 1-j | -1-j | 0 | 0 |
| X2 | 0 | 0 | -1-j | -1+j | -1+j | -1-j | 0 | 0 | 0 | 0 | -1-j | -1+j | -1+j | -1-j | 0 | 0 |
| Y2 | -1-j | -1-j | 0 | 0 | 0 | 0 | -1-j | -1+j | -1-j | -1-j | 0 | 0 | 0 | 0 | -1-j | -1+j |

Figure 8B

| Frame | SYMBOL | | | | | | | | | | | | | | | |
|---|---|---|---|---|---|---|---|---|---|---|---|---|---|---|---|---|
|  | Q | R | S | T | U | V | W | X | Y | Z | A1 | B1 | C1 | D1 | E1 | F1 |
| X1 | 1+j | 1-j | 0 | 0 | 0 | 0 | -1+j | -1-j | 1+j | 1-j | 0 | 0 | 0 | 0 | -1+j | -1-j |
| Y1 | 0 | 0 | 1+j | -1+j | 1-j | -1-j | 0 | 0 | 0 | 0 | 1+j | -1+j | 1-j | -1-j | 0 | 0 |
| X2 | 0 | 0 | 1-j | 1+j | 1+j | 1-j | 0 | 0 | 0 | 0 | 1-j | 1+j | 1+j | 1-j | 0 | 0 |
| Y2 | 1-j | 1+j | 0 | 0 | 0 | 0 | 1-j | 1+j | 1-j | 1+j | 0 | 0 | 0 | 0 | 1-j | 1+j |

OPTICAL MODULATION SCHEMES HAVING REDUCED NONLINEAR OPTICAL TRANSMISSION IMPAIRMENTS

CROSS-REFERENCE TO RELATED APPLICATIONS

This application is a Continuation in part (CIP) of U.S. application Ser. No. 13/969,694 filed Aug. 19, 2013 which claims benefit from U.S. Provisional Application No. 61/725,221 filed Nov. 12, 2012.

FIELD OF THE INVENTION

The present application relates generally to management of communications systems, and more specifically to optical modulation schemes having reduced nonlinear optical transmission impairments.

BACKGROUND

Figure 1:
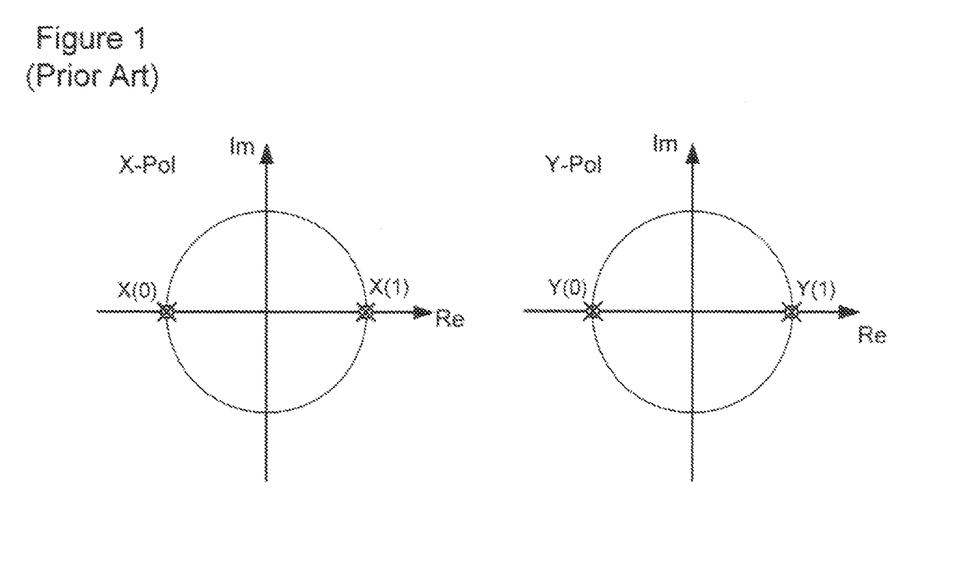
FIG. 1 illustrates a DP-BPSK signal constellation in the Real(Re)/Imaginary(Im) plane.

For achieving long distance optical signal transmission, at moderate spectral efficiencies, dual polarization Binary Phase Shift Keying (DP-BPSK) and coherent detection are commonly used. As is known in the art, BPSK encodes a single bit value ("0" or "1") onto an optical carrier by modulating the carrier phase between two constellation points that are separated by 180°. DP-BPSK achieves a spectral efficiency of 2-bits per symbol period (baud), by independently modulating single bit values onto each of the orthogonal polarization modes of the optical carrier. This is illustrated in FIG. 1, which shows the BPSK constellation mapped onto the Real (Re)-Imaginary (Im) plane of each of the X- and Y-polarizations.

Figure 2:
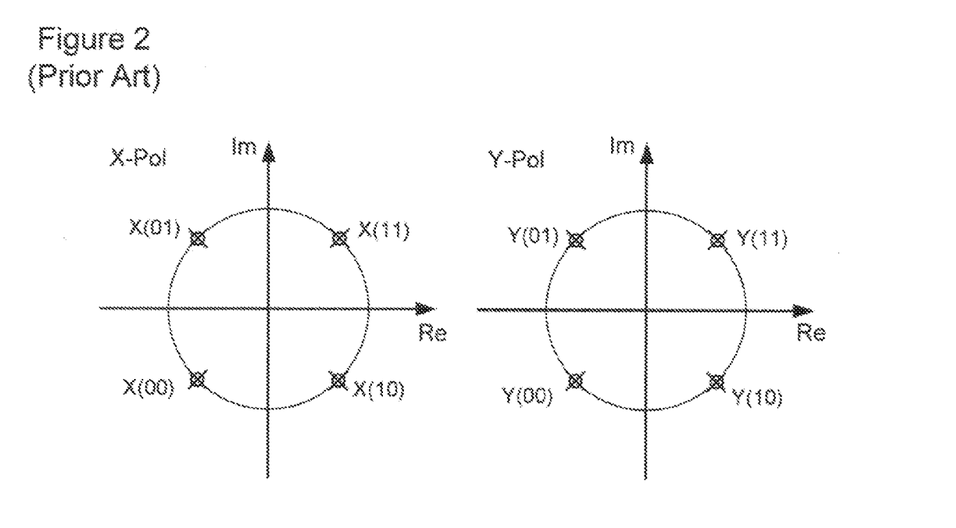
FIG. 2 illustrates a DP-QPSK signal constellation.

As is known in the art, other modulation schemes enable increased numbers of bits to be encoded onto a symbol. For example, Quadrature Phase Shift Keying (QPSK) enables two bits to be encoded on each polarization, and thus four bits per baud for dual polarization QPSK (DP-QPSK), by using a symmetrical 4-point constellation, as may be seen in FIG. 2. Other modulation schemes, such as Quadrature Amplitude Modulation (QAM) achieve even higher numbers of bits per symbol by modulating both the phase and amplitude of the optical field. However, as the number of encoded bits-per-symbol increases, the Euclidian distance between neighbouring constellation points decreases. For example, in the BPSK constellations shown in FIG. 1, each constellation point is separated from its neighbour by an angle corresponding to 180° in the Re-Im plane. On the other hand, in the QPSK constellations shown in FIG. 2, each constellation point is separated from its neighbour by an angle corresponding to 90° in the Re-Im plane. The reduced separation between adjacent constellation points results in a corresponding decrease in noise tolerance.

Because BPSK maximizes the Euclidian distance between adjacent points in the constellation, it is favoured for long distance transmission (for example under-sea fiber links) and other links having a low signal-to-noise ratio, in spite of the higher spectral efficiency achievable using other modulation schemes. The use of DP-BPSK increases spectral efficiency, but is vulnerable to polarization-dependent impairments, such as Polarization Dependent Loss (PDL).

"*Polarization QAM Modulation (POL-QAM) for Coherent Detection Schemes*", H. Bulow, OSA/OFC/NFOEC 2009, describes the use of a sphere packing constellation in the four optical dimensions (XI, XQ, YI, and YQ, representing the real, I, and imaginary, Q, axes of each of the X- and Y-polarizations). This constellation has 24 constellation points which encode a little more than four bits per symbol.

"*Power-Efficient Modulation Formats in Coherent Transmission Systems*" Agrell et al, Journal of Lightwave Technology, Vol. 27, No. 22, Nov. 15, 2009, describes a three bit per symbol constellation because of its performance at high signal to noise ratios (SNR). In FIG. 6 they also show a point for a tetrahedron constellation that encodes two bits per symbol, that also works well at high SNR. However, modern coherent optical transmission systems typically operate at low SNR with forward error correction able to correct bit error rates of several percent. Nonlinearly induced signal distortion such as cross phase modulation (XPM) and cross polarization modulation (XPolM) can also can be severe.

"*Beyond 240 Gb/s per Wavelength Optical Transmission Using Coded Hybrid Subcarrier/Amplitude/Phase/Polarization Modulation*", Djordjevic et al, IEEE Photonics Technology Letters, Vol. 22, No. 5, Mar. 1, 2010, describes modulating codes onto three of the four optical dimensions, expressed as three stokes parameters. However, as this technique leaves one dimension unused, it has reduced spectral efficiency.

Techniques that reduce nonlinear signal distortion due to transmission in optical fiber remain highly desirable.

SUMMARY

An aspect of the present invention provides a method of transmitting a data signal using an optical transmitter of an optical communications system. The optical transmitter is configured to modulate an optical carrier in successive signalling intervals to generate an optical signal. A modulation scheme is provided which comprises a multi-dimensional symbol constellation. The modulation scheme is designed such that an average degree of polarization of a modulated optical signal output from the optical transmitter has a first value when averaged across a first signalling interval, and has a second value when averaged across more than one and fewer than 100 signalling intervals. The second value is less than 10 percent of the first value.

In a further aspect of the present invention, the modulation scheme is designed such that the variation of optical power of the optical signal is minimized over a predetermined interval. In some embodiments, the predetermined interval corresponds with a memory of an optical fiber channel through which the optical signal is conveyed. It can be shown that the method described above, which may be referred to as polarization balancing, satisfies this criterion. Other methods include, but are not limited to, minimizing the power variation of each of the X and Y field polarizations, and controlling the relative phases of symbols modulated onto the orthogonal X and Y field polarizations of each signalling interval.

During run-time, an encoder of the optical transceiver encodes data to be transmitted as a series of symbols selected from the M-dimensional constellation and a modulator of the optical transceiver modulates the available dimensions of the optical field (real and imaginary components of the orthogonal X and Y field polarizations) in accordance with the symbols in one or more signalling intervals.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 3:
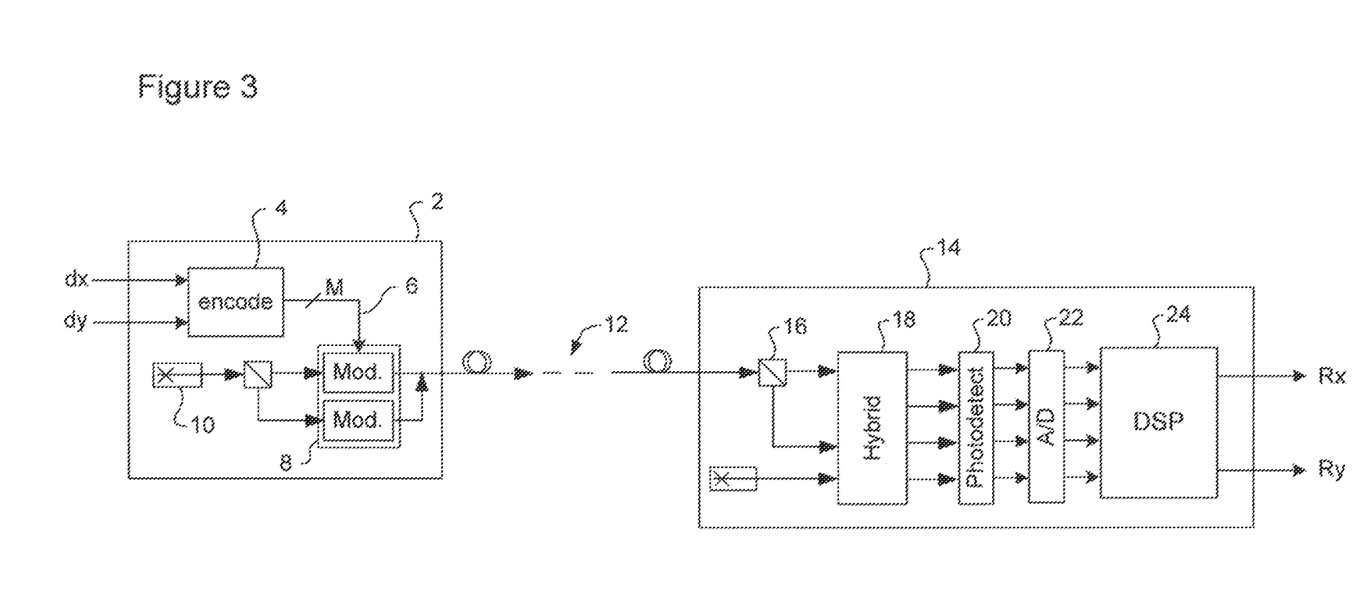
FIG. 3 is a block diagram schematically illustrating elements of a transmitter implementing methods in accordance with the present invention.

FIG. 3 illustrates a representative optical communication system in which techniques in accordance with the present disclosure may be implemented. In the optical communication system of FIG. 3, a transmitter 2 generally comprises an encoder 4 for encoding a pair of data signals (dx and dy) using an M-dimensional constellation to generate a set of M drive signals 6. The drive signals are then supplied to a modulator 8 for modulating respective dimensions of a continuous wave (CW) optical carrier in accordance with the drive signals. In the example of FIG. 3, a pair of data signals (dx and dy) may be encoded as M=4 drive signals, which are then used to modulate two dimensions (e.g. phase and amplitude, or I and Q) of each orthogonal polarization of the optical carrier. The CW carrier is typically generated by a laser 10 in a manner known in the art, and the modulator may be implemented using any of a variety of known modulator devices, such as phase modulators, variable optical attenuators, Mach-Zehnder interferometers etc. The modulated optical signal appearing at the output of the modulator is transmitted through an optical fiber link 12 to a coherent receiver 14.

A receiver 14 configured to receive and detect the transmitted data signals may be provided as a coherent receiver, which includes a polarization beam splitter 16 for splitting the received optical signal into received X and Y polarizations, an optical hybrid 18 for separately mixing the X and Y polarizations with a local oscillator, and a set of photodetectors 20 for detecting the optical power of each of the mixing products generated by the optical hybrid 18. An Analog to Digital (A/D) converter block 22 samples each photodetector current, and the resulting sample streams—each of which represents one of the modulated dimensions of the optical carrier field—are processed by a Digital Signal Processor (DSP) 24 in accordance with the M-dimensional constellation to generate recovered signals Rx and Ry that correspond with the transmitted data signals dx and dy.

The present application provides techniques for temporally interleaved data transmission that minimizes nonlinear distortion developed during propagation of the modulated signal through the optical fiber link 12. The present technique utilizes an encoding scheme in which an N-symbol constellation is defined in an M-dimensional space. A data word can be encoded as one or more symbols of the constellation, which can then be modulated by the transmitter 2 onto the available dimensions of the optical carrier in one or more signaling intervals of duration T.

A convenient visualization of the M-dimensional constellation is to consider a set of orthogonal 2-dimensional frames, each of which contains a respective 2-dimensional projection of the constellation. In this case, the respective images (projections) of any two frames are related to each other by a rotation of the constellation about at least one axis of the M-dimensional space. Each frame may be associated with the Re-Im (or, equivalently, the I-Q) plane of a linearly polarized optical carrier, and so used in a transmitter to modulate the amplitude and phase of the optical carrier within a signaling interval of duration T. Similarly, the frame associated with a given transmitted polarization can be used in a coherent receiver to detect and decode data symbols of the constellation. By suitable selection of the rotation axes between frames, any two constellation points that have a small Euclidian separation in one frame will have a large Euclidian separation in at least one other frame. Because the separation of any two constellation points is large in at least one frame, encoded $\log_2(N)$-bit data symbols can be unambiguously detected in a coherent receiver by correlating sample streams of each transmitted polarization to the associated frame(s), even in cases where signal-to-noise ratio is very low.

As noted above, at least two frames are required to unambiguously detect any given encoded data symbol. As such, multi-dimensional encoded data symbols with M>4 must be transmitted in at least two separate signaling intervals, or across multiple optical carrier (or sub-carrier) wavelengths.

Figures 4A, 4B, 4C:
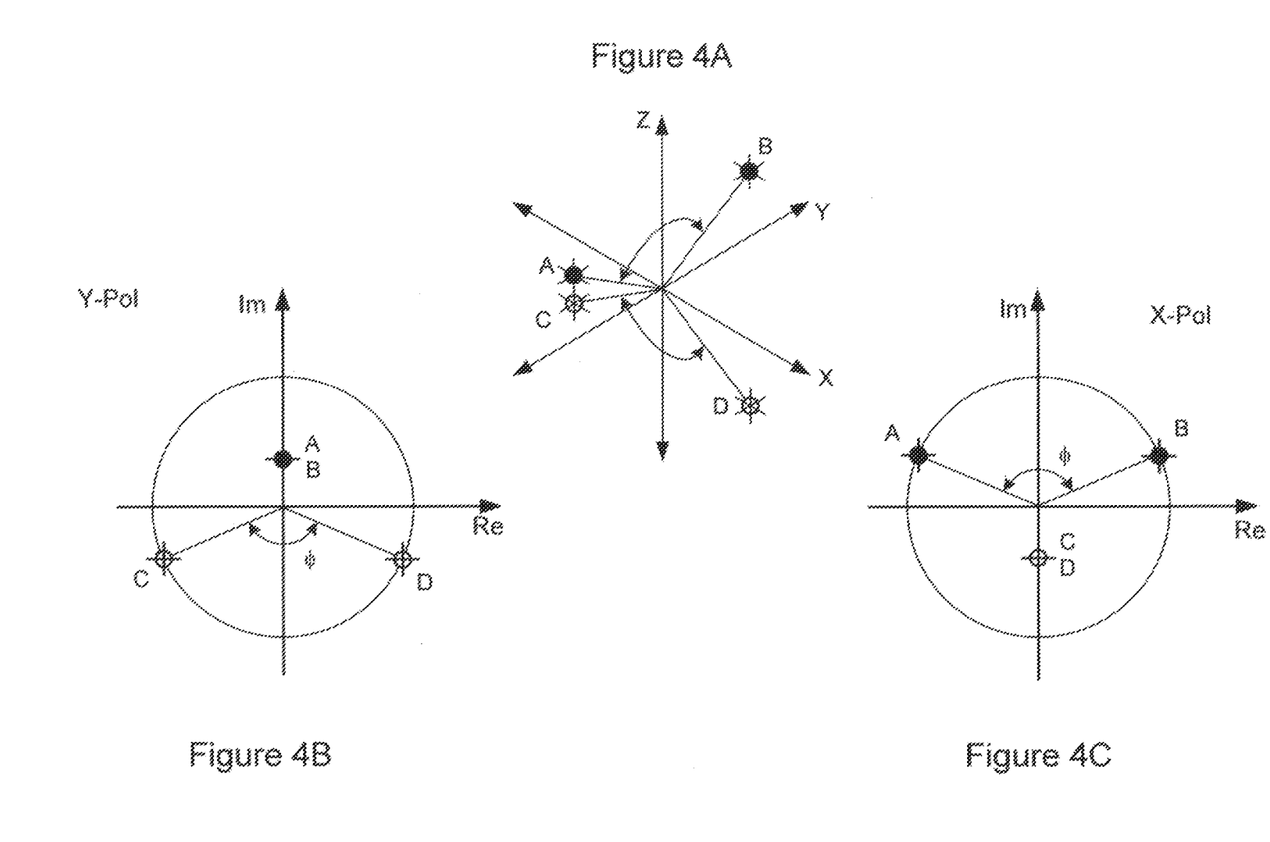
FIGS. 4A-C illustrate a dual-polarization V-constellation with symmetric labelling.

FIGS. 4A-C illustrates an example embodiment comprising a V-constellation with symmetric labelling. As may be seen in FIG. 4A, an M=3-dimensional constellation comprises N=4 symbols (denoted as A, B, C and D), which can be used to encode 2-bit data words. Symbols A and B are co-planar in the 3-dimensional constellation, and are separated from each other by an angle φ. Similarly, symbols C and D are co-planar and separated from each other by an angle φ. The 3-dimensional constellation may be mapped to two orthogonal 2-dimensional frames, each of which contains a respective image (projection) of the 3-dimensional constellation. In the illustrated example, FIG. 4B illustrates a frame containing a projection in the X-Z plane of the 3-dimensional constellation, while FIG. 4C illustrates a frame containing a projection in the Y-Z plane of the 3-dimensional constellation. It will also be seen that the projections of FIGS. 4B and 4C are related by a 90° rotation of the 3-dimensional constellation about the Z-axis.

Each of the 2-dimensional frames may be associated with a respective polarization of a dual-polarization continuous wave optical carrier. In the illustrated example, the frame of FIG. 4B is associated with the Y-polarization, and the frame of FIG. 4C is associated with the X-polarization. As such, each frame defines the amplitude and phase (or, equivalently, I and Q) parameters that may be used in the transmitter 2 to modulate the phase and amplitude of its associated polarization within a respective signaling interval having a duration of T. This is further illustrated in FIG. 5A, which shows the frames of FIGS. 4B and 4C (denoted, for convenience as A1 and A2) modulated onto respective polarizations of the optical carrier, within a transmission interval of duration T.

Figure 5A:
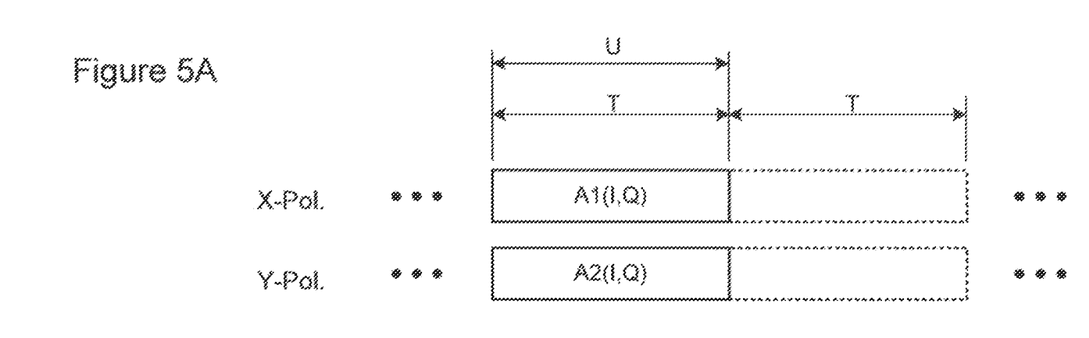
FIGS. 5A-B illustrate the distribution of frames across orthogonal polarization and time slots of an optical carrier.
Figure 5B:
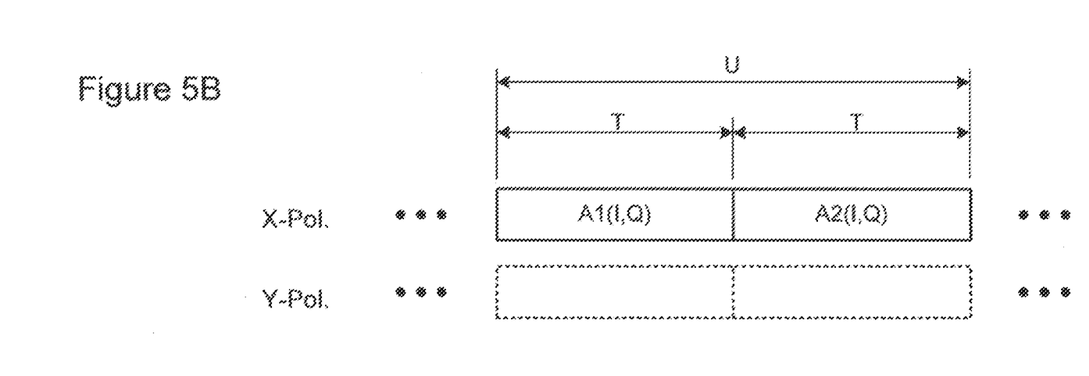

FIG. 5B illustrates an alternative scenario, in which the 2-dimensional frames are temporally distributed within a single polarization (in this case, the X-polarization) of a linearly polarized continuous wave optical carrier. As may be appreciated, in the case of a multi-dimensional constellation in which more than two frames are used to transmit a given data symbol, the corresponding signaling intervals used to convey each symbol may be distributed over any suitable combination of polarization, time, carrier (or sub-carrier) wavelength, fiber propagation modes, or cores within a multi-core fiber.

In both of the examples of FIGS. 5A and 5B, each frame is modulated onto the optical carrier within a respective signaling interval of duration T. It is therefore reasonable to refer to a "symbol period" U, which is a period of time equal to the span of the signaling intervals used to transmit each data symbol. In the example of FIG. 5A, the symbol period is U=T, while in FIG. 5B the symbol period is U=2T, with adjacent signaling intervals in each example (the signaling intervals need not be adjacent, but for simplicity that is the case for all examples here). It may be noted that, because frames can be modulated onto orthogonal polarizations, or multiple carrier (or sub-carrier) wavelengths, within simultaneous (or overlapping) signaling intervals, the symbol period U reflects the actual elapsed time during which a given symbol is actually being modulated onto the optical carrier. For example, in FIG. 5A, the two frames are modulated onto respective polarizations within simultaneous signaling intervals, resulting in a symbol interval U that is equal to that of the actual duration, T, during which a symbol is being modulated onto the optical carrier. In FIG. 5B, on the other hand, the two frames are temporally distributed within a single polarization resulting in a symbol period of total duration U=2T.

The inventors of the present application have discovered that nonlinear signal distortion can be minimized by encoding data words using a multi-dimensional symbol constellation having at least some of the following metrics:

A) a symbol of the constellation is transmitted by an optical transceiver in a predetermined symbol period of at least two signaling intervals of the optical transceiver;

B) the average degree of polarization of a modulated optical signal output from an optical transceiver, averaged across a first signaling interval is some value, and is less than 10 percent of that value when averaged across fewer than 100 signaling intervals of the signal;

C) The variance in the modulation power of the optical signal is approximately zero over the symbol period U;

D) The difference between the optical powers within each signaling interval, T, that comprise one symbol period, U, is approximately zero;

E) The optical power in the carrier is approximately zero over the symbol period U;

F) a characteristic of the transmission interval has a small correlation with the data symbol; and G) the correlation between different modulation states of the optical signal is approximately zero over the symbol period U.

In some embodiments, design metric B above may be satisfied for sets of contiguous signalling intervals that include the first signalling interval, where each set contains more than one and less than 100 signalling intervals. In some embodiments, each set contains more than one and less than 65 signalling intervals. In other embodiments, design metric B above may be satisfied for the case where an output optical signal is modulated in a contiguous stream of signalling intervals composed of two or more interleaved sub-streams of signalling intervals, and where the first signalling interval is a member of one of the interleaved sub-streams. Each one of the interleaved sub-streams may have an average polarization greater than 10 percent, but the output optical signal has an average polarization of less than 10 percent when averaged across fewer than 100 signalling intervals.

Various different multi-dimensional constellations that satisfy the above design metrics are described below. These constellations provide a significant increase in net system margin relative to conventional modulation formats, such as DP-BPSK, while retaining the same data capacity as conventional modulation schemes.

X-Constellation: Polarization Balanced, 8 Dimensional Biorthogonal Modulation

Figure 6A:
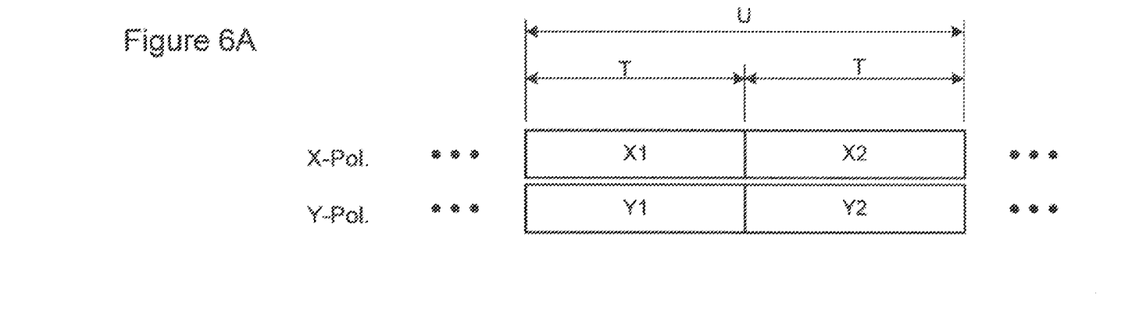
FIGS. 6A-B illustrates the complex symbols comprising the X-Constellation.

FIGS. 6A and 6B illustrate one embodiment of a modulation scheme utilizing an M=8-dimensional constellation of N=16 symbols (labelled as "A" ... "P"). As may be seen in FIG. 6A, the constellation is transmitted as four 2-dimensional frames (labelled as X1, Y1, X2, Y2) each of which is used to modulate the optical carrier within a respective signaling interval of duration T. All four frames are transmitted in two consecutive time-slots, so that the symbol period (the actual time in which a given symbol is transmitted) is U=2T.

Figure 6B:
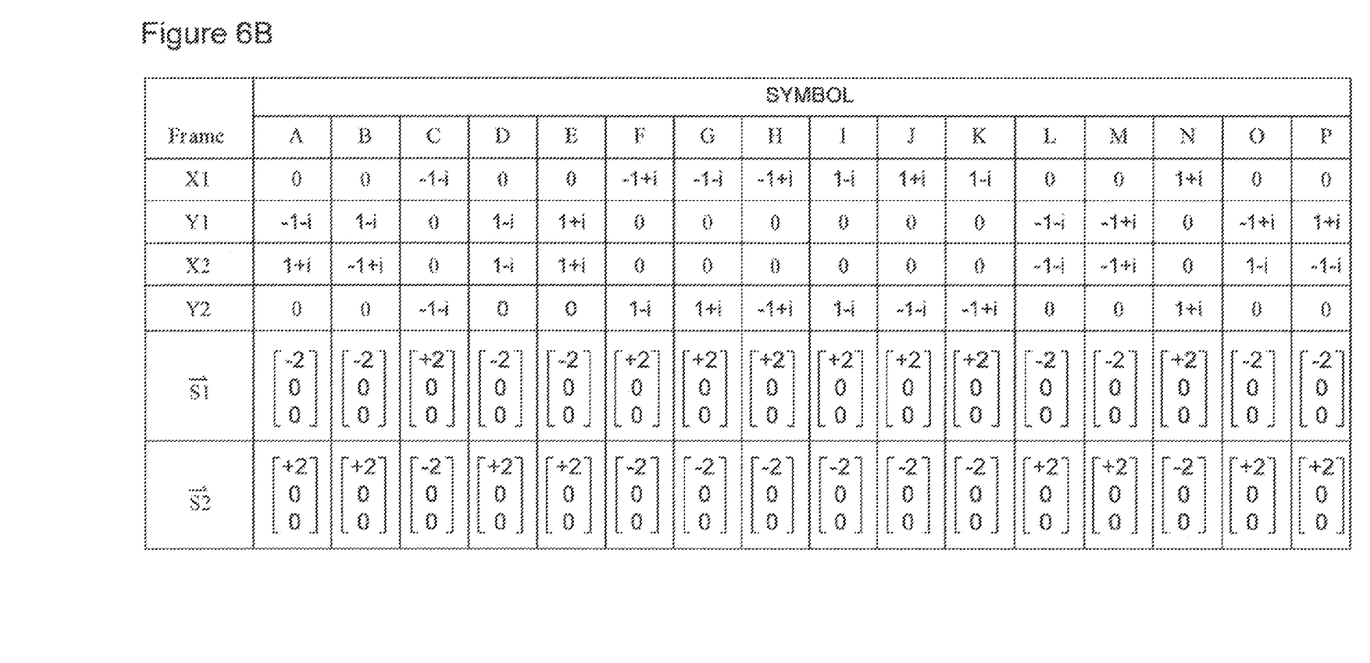

The upper part of FIG. 6B shows the complex value of each symbol of the constellation, in each of the four frames (X1, Y1, X2, Y2). The lower portion of the table shows the respective Stokes vectors of the modulated optical signal in each of the involved signal intervals. As may be seen, the degree of polarization (DOP) of the modulated optical signal is DOP=$|\vec{S}1-\vec{S}2|$=0 over an interval of the symbol period, U=2T.

The relevant properties of this constellation may be summarized as follows:

capacity of 1 bit/polarization/signaling interval (equivalent to DP-BPSK); and symbols are encoded across two adjacent signaling intervals of duration T, for a symbol period of U=2T.

An eight-dimensional unitary transformation is applied to an eight-dimensional biorthogonal constellation to guarantee that for any given symbol:

the degree of polarization of the optical field is zero over the symbol period U=2T;

the variance of the optical power is zero over a time interval of length U; and the correlation between different modulation states within the interval U is zero.

The optical-signal-to-noise ratio (OSNR) required to achieve a bit error rate (BER) of 0.034 is reduced by 0.53 dB relative to DP-BPSK for the case of linear transmission with additive white Gaussian noise (AWGN);

The net system margin is typically increased by 2 dB relative to standard DP-BPSK following nonlinear propagation ΛV and Symmetrized Simplex Constellations The V-type constellation of FIG. 4A and other known four-dimensional simplex constellations possess a nonzero average degree of polarization over long time intervals, causing an increased level of nonlinear signal distortion. The ΛV and symmetrized simplex constellations are constructed such that:

capacity of 1 bit/polarization/signaling interval (equivalent to DP-BPSK); and symbols are encoded in a signaling interval of duration T.

A symbol is selected from the standard V-type (or four-dimensional simplex constellation) in a first signaling interval of duration T.

Figure 7:
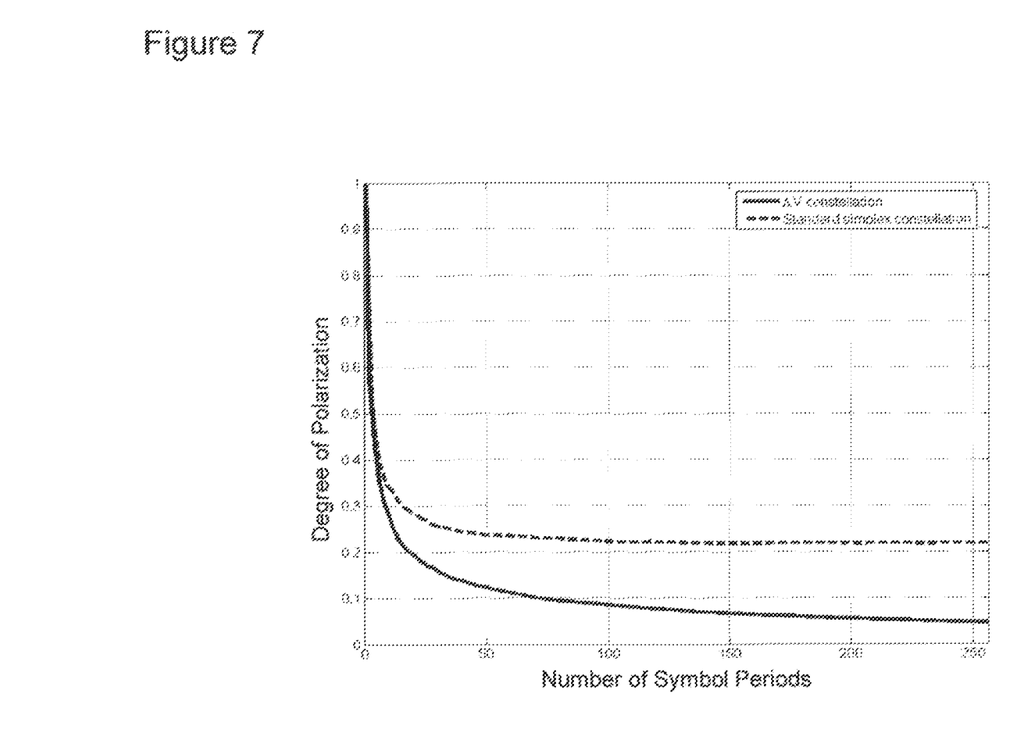
FIG. 7 is a chart illustrating the variation of the Degree of Polarization with Number of Symbol Periods using a ΛV constellation.

In the next signaling interval, a symbol is selected from a complementary Λ-constellation, which is a polarization rotated version of the V-type constellation used for the first signaling interval. Thus, Λ=RV, where R is a 2×2 polarization rotation matrix chosen to ensure that the average degree of polarization is zero over long time intervals. As may be seen in FIG. 7, the average degree of polarization for the ΛV constellation (solid line) is significantly lower than that of the conventional V-type or simplex constellation (dashed line) as the number of symbol periods increases. In the example of FIG. 7, the average degree of polarization for the ΛV constellation is less than 0.1 (10-percent) after approximately 70 symbol periods. In other embodiments, the average degree of polarization may drop below 0.1 in more or fewer symbol periods. In general, it is preferable for the average degree of polarization to be reduced below 0.1 in as few symbol periods as possible, and preferably less than 100 symbol periods.

The OSNR required to achieve a BER of 0.034 is reduced by 0.33 dB and 0.25 dB relative to DP-BPSK for ΛV and four-dimensional simplex, respectively, in linear channels with AWGN.

The net system margin is typically increased by between 0.3 to 0.6 dB relative to standard DP-BPSK following nonlinear propagation.

PB-PS-QPSK: Polarization Balanced, Polarization Switched QPSK

Figure 8A:
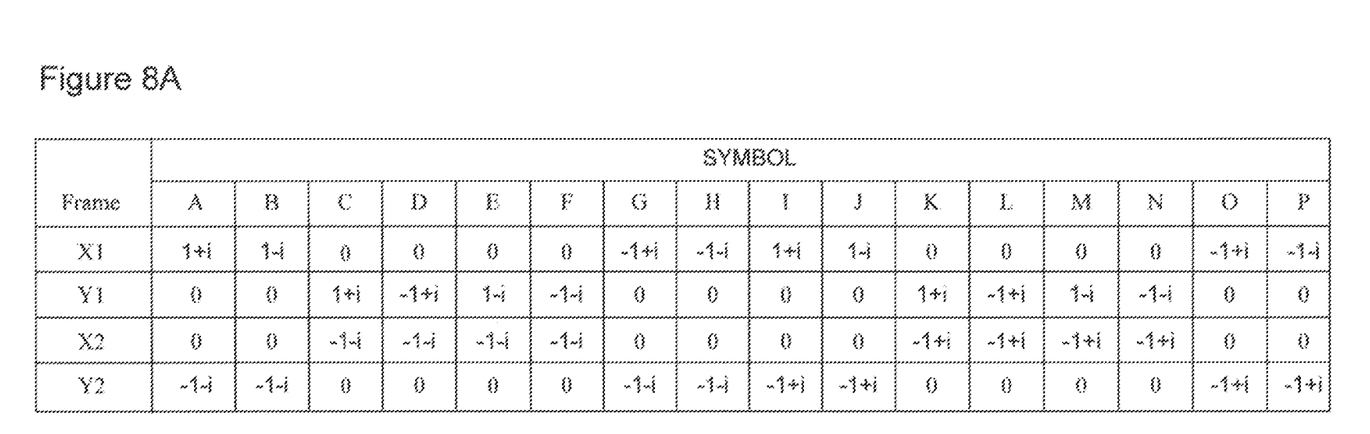
FIGS. 8A-B illustrate a Polarization balanced, polarization switched QPSK modulation scheme.
Figure 8B:
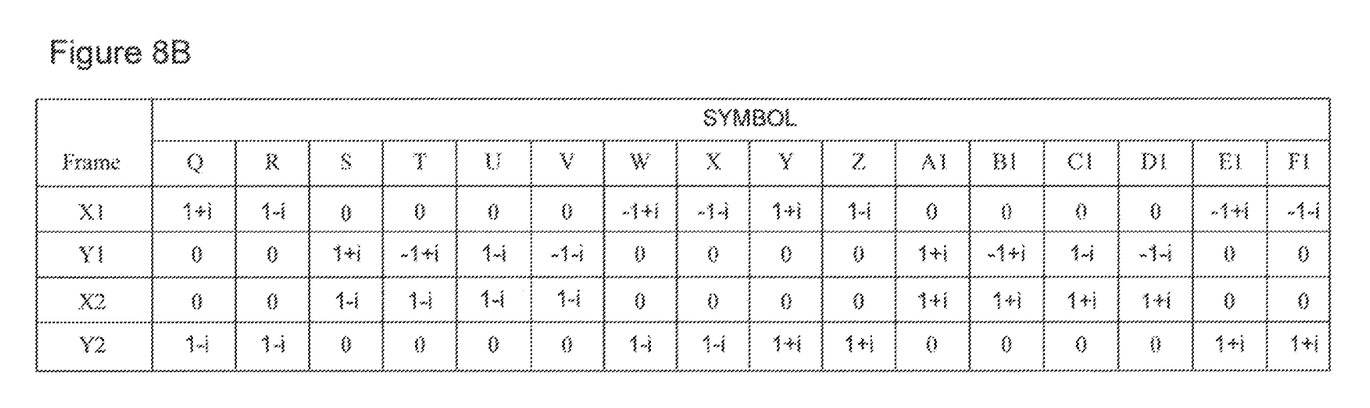

FIGS. 8A and 8B illustrate a modulation scheme utilizing an M=8-dimensional constellation of N=32 symbols (labelled as "A" . . . "F1"). As in the X-Constellation described above, the constellation is transmitted as four 2-dimensional frames (labelled as X1, Y1, X2, Y2) each of which is used to modulate the optical carrier within a respective signaling interval of duration T. All four frames are transmitted in two consecutive time-slots, so that the symbol period (the actual time in which a given symbol is transmitted) is U=2T.

FIGS. 8A and 8B show the complex value of each symbol of the constellation, in each of the four frames (X1, Y1, X2, Y2).

The relevant properties of this constellation may be summarized as follows:
capacity of 1.25 bits/polarization/signaling interval; and
symbols are encoded across two adjacent signaling intervals of duration T, for a symbol period of U=2T.

A symbol is selected from a standard polarization switched QPSK (PS-QPSK) constellation in the first signaling interval of duration T.

In the subsequent signaling interval, a QPSK symbol is transmitted on the cross polarization.

This constellation encodes a total of 5 bits across the symbol period of U=2T.

This constellation guarantees that the optical field possesses a degree of polarization of zero over the symbol period of U=2T.

The OSNR required to achieve a BER of 0.034 is reduced by 0.97 dB relative to standard PS-QPSK in linear channels with AWGN.

The net system margin is typically increased by >0.2 dB relative to standard DP-BPSK after nonlinear propagation, despite a 25% increase in channel capacity.

PB-DP-QPSK: Polarization Balanced, Dual Polarization QPSK

This constellation has a capacity of 1.5 bits/polarization/signaling interval, with 6 bits encoded across a symbol period of U=2T, for a total of $2^6$=64 constellation points.

As in the X-Constellation described above, the constellation is transmitted as four 2-dimensional frames (labelled as X1, Y1, X2, Y2) each of which is used to modulate the optical carrier within a respective signaling interval of duration T. All four frames are transmitted in two consecutive time-slots, so that the symbol period (the actual time in which a given symbol is transmitted) is U=2T.

The constellation is constructed as follows:
frames X1, Y1 and X2 are each selected from the set of QPSK symbols, i.e. S∈[1,−1,i,−i]; and
the remaining frame, Y2, is calculated according to Y2=−Y1·X2·X1*, where the superscript * denotes complex conjugation, to ensure zero degree of polarization over the total symbol period of U=2T.

The OSNR required to achieve a BER of 0.034 is equivalent to standard PS-QPSK in linear channels with AWGN.

The net system margin is typically increased by >1 dB relative to standard PS-QPSK following nonlinear propagation.

PB-QPSK-8PSK, Polarization Balanced, Temporally Interleaved QPSK and 8-PSK

This constellation has a capacity of 1.75 bits/polarization/signaling interval, with 7 bits encoded across two transmission intervals, for a total of $2^7$=128 constellation points.

As in the X-Constellation described above, the constellation is transmitted as four 2-dimensional frames (labelled as X1, Y1, X2, Y2) each of which is used to modulate the optical carrier within a respective signaling interval of duration T. All four frames are transmitted in two consecutive time-slots, so that the symbol period (the actual time in which a given symbol is transmitted) is U=2T.

The constellation is constructed as follows:
frames X1 and Y1 are each selected from the set of standard QPSK symbols, i.e. S∈[1,−1,i,−i];
frame X2 is selected from the set of 8-PSK symbols, i.e. S=exp(iφ), where $$\phi \in \left[\frac{\pi}{8}, \frac{3\pi}{8}, \frac{5\pi}{8}, \frac{7\pi}{8}, \frac{9\pi}{8}, \frac{11\pi}{8}, \frac{13\pi}{8}, \frac{15\pi}{8}\right];$$

and
the remaining frame, Y2, is calculated according to Y2=−Y1·X2·X1*, where the superscript * denotes complex conjugation, to ensure zero degree of polarization over the total symbol period of U=2T.

The OSNR required to achieve a BER of 0.034 is increased by 0.2 dB relative to DP-QPSK in linear channels with AWGN The net system margin is typically increased by 1 dB relative to standard DP-QPSK following nonlinear propagation.

As evidenced by the PB-DP-QPSK and PB-QPSK-8PSK constellations described above, other multi-dimensional constellations with increased transmission capacity may be constructed through the appropriate phase and amplitude modulation of the X1, Y1 and X2 frames. The remaining frame is calculated to achieve the desired constellation properties, such as zero degree of polarization, over the symbol period. This method generalizes in an obvious manner to multi-dimensional constellations with symbol periods U>2T.

PA-QPSK, Polarization Alternating, Temporally Interleaved QPSK

Figure 9:
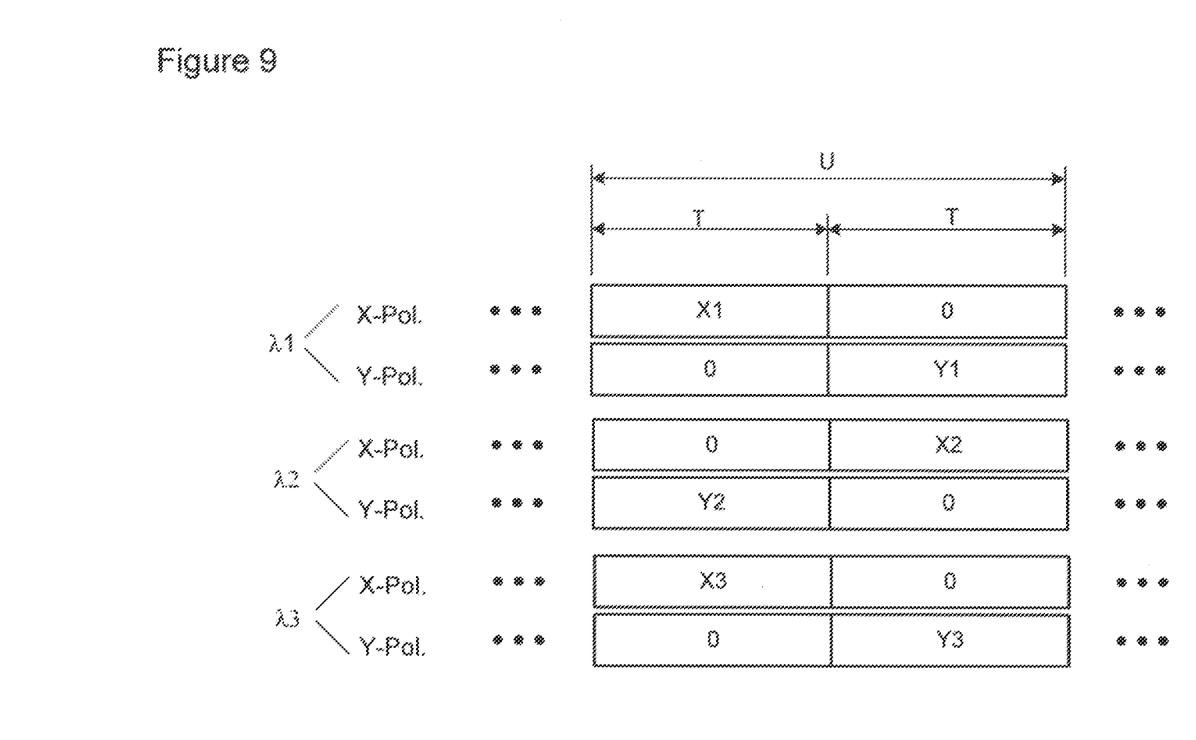
FIG. 9 illustrates a Polarization alternating, temporally interleaved QPSK modulation scheme for the case of 3 adjacent optical carrier (or sub-carrier) wavelengths.

FIG. 9 illustrates a Polarization alternating, temporally interleaved QPSK modulation scheme for a representative case utilizing an M=24-dimensional constellation distributed across, for example, 3 carrier (or sub-carrier) wavelengths. In the embodiment of FIG. 9, the constellation is transmitted as six 2-dimensional frames (labelled as X1, Y1, X2, Y2, X3, Y3) distributed across alternating polarizations of three carrier (or sub-carrier) wavelengths, and two consecutive time-slots, so that the symbol period (the actual time in which a given symbol is transmitted) is U=2T. This modulation extends to >3 carrier (or sub-carrier) wavelengths in an obvious manner.

This constellation has a capacity of 1 bit/polarization/signaling interval (equivalent to DP-BPSK).

The symbol constellation is constructed as follows:

frames X1, X2, ..., XN and Y1, Y2, ..., YN are each randomly selected from the set of standard QPSK symbols, i.e. S∈[1,−1,i,−i]; and the frames X1, X2, ..., XN and Y1, Y2, ..., YN are transmitted on alternate polarizations both between adjacent signaling intervals and adjacent optical wavelengths, with a value of zero transmitted on the orthogonal polarization.

In the case of several closely spaced carrier (or sub-carrier) wavelengths, a π/2 rad polarization rotation is desired between adjacent carrier (or sub-carrier) wavelengths.

This constellation is constructed such that information carrying symbols alternate between the orthogonal X- and Y-polarizations. The degree of polarization of the modulated signal is zero when measured over any two adjacent signaling intervals (either consecutive signaling intervals of any one sub-channel or adjacent sub-channels) in the transmit optical waveform.

A π/2 rad polarization rotation between carrier (or sub-carrier) wavelengths guarantees that the optical field possesses a degree of polarization of zero when measured within any single signaling interval, prior to propagation through linear dispersion.

The OSNR required to achieve a BER of 0.034 is equivalent to DP-BPSK in linear channels with AWGN.

The net system margin is equivalent to DP-BPSK in optically uncompensated systems following nonlinear propagation.

The net system margin is typically increased by >1.5 dB relative to DP-BPSK in optically dispersion compensated systems following nonlinear propagation.

The examples above, for clarity, use signaling intervals that are adjacent in time on a single optical carrier wavelength (with the exception of PA-QPSK). One could choose to use a plurality of carrier (or sub-carrier) wavelengths and have the signaling intervals for one symbol occur at the same time, or at separated times across any subset of that plurality. It would be advantageous for the plural carriers (or sub-carriers) comprising one signal to have similar wavelengths, so as to minimize the differential polarization rotation due to polarization mode dispersion (PMD).

Linearly polarized basis modes, i.e. the orthogonal X- and Y-polarizations, have been described. Circular or any other set of orthogonally polarized basis states could be used.

To achieve long reach, and more fully satisfy the listed properties, it can be desirable for N<$2^M$. To achieve higher spectral efficiency, one may choose N to be greater than this.

For simplicity, the examples have shown clearly distinct, static, constellations. One could choose to have multiple choices that are very close to each other that encode substantially the same information. One could choose to have the constellation evolve as a function of time, perhaps periodically, or in response to measured channel conditions.

A fixed number of signaling intervals per symbol has been described. The number could vary, for example in dependence on the symbol, the time, or the channel conditions. Rather than balancing the polarization within one symbol, one could achieve balance after a set of symbols. For example, every ninth signaling interval (or frame) could be chosen so as to minimize the average degree of polarization across itself and four neighbours on each side. Or, it could be chosen to minimize a cumulative average degree of polarization.

The techniques described above with reference to FIGS. 4-9 may be referred to as polarization balancing, because in each case the average degree of polarization is minimized over a chosen interval. A limitation of the polarization balancing technique is that as the spectral efficiency (bits per signalling interval) is increased, the performance gain due to reduced nonlinear interference is at least partially offset by degraded linear performance due to the increased size of the constellation alphabet (that is, the number of symbols in the constellation). In some cases, the benefits of polarization balancing may be entirely overwhelmed by degraded linear performance for spectral efficiencies above four bits per signalling interval.

Figure 10:
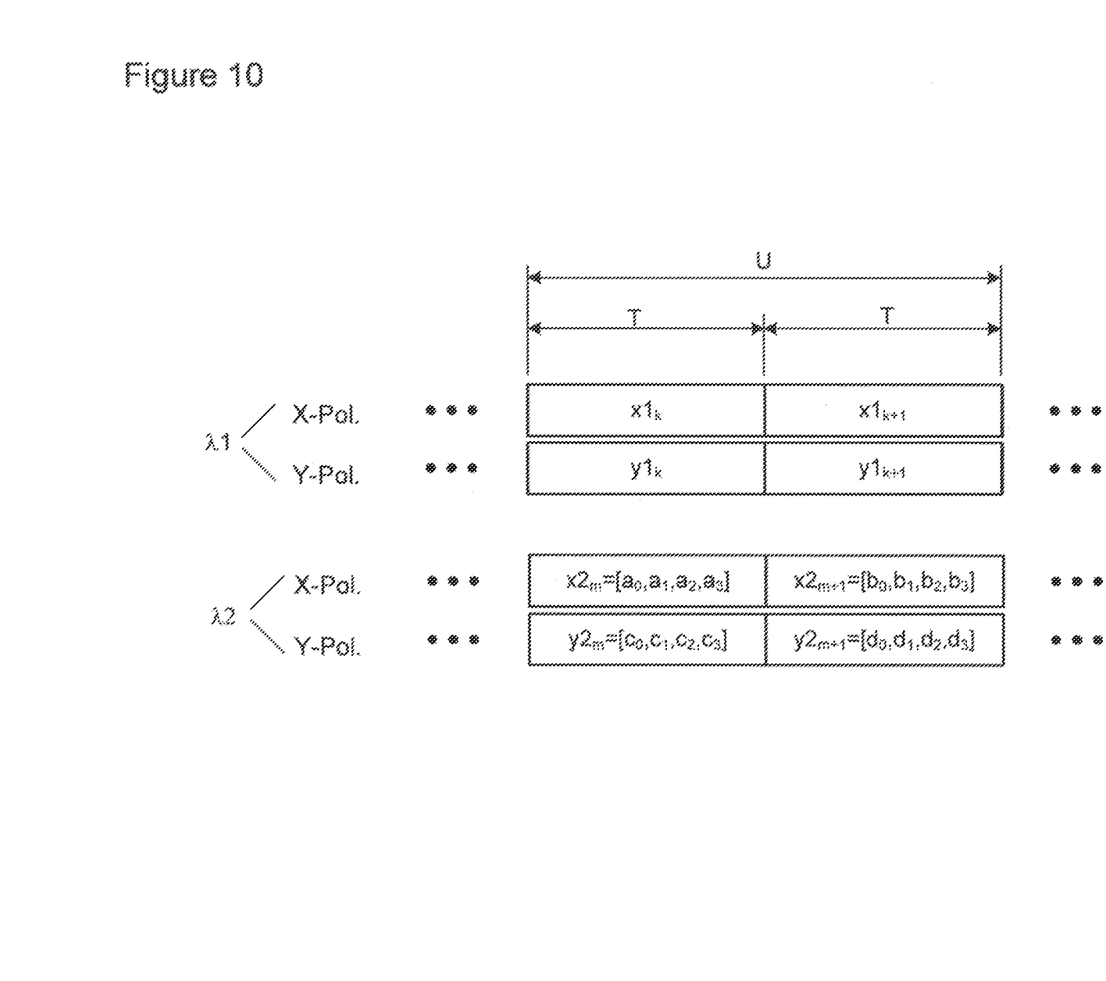
FIG. 10 illustrates a 16-QAM modulation for the case of 2 adjacent optical carrier (or sub-carrier) wavelengths.

Referring to FIG. 10, these limitations may be overcome by recognising that the cross-polarization modulation (XPolM) noise affecting the symbols $x1_k$ and $y1_k$ modulated onto the X- and Y-polarizations of a given channel (referenced as λ1 in FIG. 10) in the k:th signalling interval can be approximated as:

$$\Delta x1_k^{XPolM} = y1_k \Sigma_m C_m^{XNLI} x2_{k+m} y2^*_{k+m}$$

$$\Delta y1_k^{XPolM} = x1_k \Sigma_m C_m^{XNLI} y2_{k+m} x2^*_{k+m}.$$

where the summation range, m=−M ... M, corresponds with the number of symbols, 2M+1, that interact through chromatic dispersion; $C_m^{XNLI}$ is a complex coefficient that quantifies an efficiency of nonlinear interactions between channel λ1 and a second channel λ2; $x2_{k+m}$ and $y2_{k+m}$ are respective symbols modulated on the X- and Y-polarizations of channel λ2 in the (k+m):th signalling interval, and the superscript * denotes complex conjugation.

In what follows, the product ab* of two transmit symbols a and b will be referred to as a symbol doublet. Further, power and polarization doublets will be defined as $x_k x_k^* = |x_k|^2$ and $x_k y_n^*$, respectively, and are constructed from transmit symbols $x_k$ and $y_n$ modulated onto the orthogonal X- and Y-polarizations of the k:th and n:th signalling intervals. In general, the transmit symbols a and b comprising a doublet may be selected from any two of the modulated frames comprising a multidimensional optical signal.

The present inventors have observed that it is possible to achieve at least partial XPolM suppression by choosing the sign of successive polarization doublets $x2_m y2^*_m$ and $x2_{m+1} y2^*_{m+1}$ to ensure that:

$$\text{sign}(x2_m y2^*_m) = -\text{sign}(x2_{m+1} y2^*_{m+1})$$

This operation may be referred to as constellation "sign balancing". As may be seen in FIG. 10, for the case of 16-QAM modulation, each of the symbols $x2_m$, $y2_m$, $x2_{m+1}$ and $y2_{m+1}$ comprise four bits $a_0, ..., a_3, b_0, ..., b_3, c_0, ..., c_3,$ and $d_0, ..., d_3$. In this example, two bits within the $y2^*_{m+1}$ frame may be defined as overhead bits for controlling the sign of the polarization doublet $x2_{m+1} y2^*_{m+1}$, while the other 14 bits are used to encode data. For example, bits $d_0$ and $d_1$ (FIG. 10) may be used as overhead bits, which may be selected to satisfy the sign balancing criterion. With this arrangement, the effective spectral efficiency is 7-bits per signalling interval, as compared to 8 bits per signalling interval for standard 16-QAM. In some embodiments, sign balancing in this manner may achieve a 1.2 dB improvement in nonlinear SNR. This results in a high spectral efficiency signal having reduced nonlinear optical transmission impairments. As may be appreciated, more or fewer bits may be allocated to the overhead bits, so as to obtain a suitable balance between nonlinear noise mitigation and spectral efficiency. In addition, overhead bits may be grouped together, or distributed across one or more signalling intervals and/or polarizations as desired. In the above example, the overhead bits are allocated to the (m+1):th signalling interval, so as to balance the sign of the doublet in the immediately preceding signalling interval. However, this is not essential. Those of ordinary skill will recognise that overhead bits of a doublet in one signalling interval may be used to balance the sign of another doublet in either (or both) adjacent signalling intervals, as desired.

The use of overhead bits in a high spectral efficiency signal (such as 16-QAM) may also be used to at least partially mitigate nonlinear XPM. In particular, the XPM induced phase noise $\Delta x1_k^{XPM}$ and $\Delta y1_k^{XPM}$ affecting the symbols $x1_k$ and $y1_k$ modulated onto the X- and Y-polarizations of a given channel (referenced as $\lambda 2$) in the k:th signalling interval, due to another channel (referenced as $\lambda 2$), can be written as:

$$\Delta x1_k^{XPM} = x1_k \Sigma_m C_m^{XNLI}[2|x2_{k+m}|^2 + |y2_{k+m}|^2 - 3P2],$$

$$\Delta y1_k^{XPM} = y1_k \Sigma_m C_m^{XNLI}[2|y2_{k+m}|^2 + |x2_{k+m}|^2 - 3P2],$$

where: P2 is the average power of channel $\lambda 2$. From this expression it follows that the XPM phase noise in channel $\lambda 1$ is related to the variation of the optical power P2 of channel $\lambda 2$, (or, equivalently the power doublets of each of the X- and Y-polarizations of channel $\lambda 2$, $|x2_{k+m}|^2 - P2$ and $|y2_{k+m}|^2 - P2$) filtered by a low-pass finite impulse response (FIR) filter with coefficients $C_m^{XNLI}$. Consequently, the XPM phase noise in channel $\lambda 1$ is dominated by the low frequency spectral components of the optical power of channel $\lambda 2$.

In the case of a WDM optical communications system, the expressions above can be used to estimate the respective contributions to the XPM phase noise affecting channel (or sub-channel) $\lambda 1$ due to varying power levels in each of the other channels (or sub-channels). The XPM phase noise in channel $\lambda 1$ can therefore be reduced by reducing power variations in at least some of the other channels (or sub-channels) of the WDM system. In the case of high spectral efficiency encoding schemes such as 16-QAM, the power variation may be mitigated by suitable selection of the overhead bit values.

As may be appreciated, the symbol constellation or overhead bits may be used for either sign-balancing or for minimizing power variations, or both, as desired. In particular, we observe that the total nonlinear noise field in channel $\lambda 1$ due to XPM and XPolM from channel $\lambda 2$ may be rewritten in the form:

$$\Delta x1_k \approx x1_k A2_{y,k} + y1_k B2_{y,k}$$

$$\Delta y1_k \approx y1_k A2_{y,k} + x1_k B2_{y,k}$$

where $$A2_{x,k} = \Sigma_m F_m[2|x2_{k+m}|^2 + |y2_{k+m}|^2 - 3P2],\text{ and}$$

$$A2_{y,k} = \Sigma_m F_m[2|y2_{k+m}|^2 + |x2_{k+m}|^2 - 3P2]$$

are identified as series of power doublets filtered by a low-pass FIR filter with coefficients $F_m$, while $B2_{x,k} = \Sigma_m G_m x2_{k+m} y2^*_{k+m}$, and $B2_{y,k} = \Sigma_m G_m y2_{k+m} x2^*_{k+m}$ are identified as series of polarization doublets filtered by a low-pass FIR filter with coefficients $G_m$. The filter coefficients $F_m$ and $G_m$ may be varied to adjust the relative weighting of the XPM and XPolM contributions as desired. Consequently, the symbol constellation, overhead bits, or both, may be selected to reduce the variance of the nonlinear noise fields, $E\{|\Delta x1_k|^2\}$ and $E\{|\Delta y1_k^2|\}$, where $E\{\ldots\}$ refers to an expectation value over a number of signalling intervals. This is achieved by reducing the variance of the filtered power doublets, $E\{|A2_{x,k}|^2\}$ and $E\{|A2_{y,k}|^2\}$, and/or the variance of the filtered polarization doublets, $E\{|B2_{x,k}|^2\}$ and $E\{|B2_{y,k}|^2\}$. In some embodiments, it may be desirable to limit the number of overhead bits such that it is not possible to completely minimize XPolM and XPM simultaneously. In such cases, it may still be possible to maximize performance of the system by partial mitigation of both XPolM and XPM.

It will further be appreciated, that in a receiver, the overhead bits may readily be isolated so that only the data bits of each symbol are used to recover the encoded data stream. Alternatively, the redundancy introduced by inclusion of additional overhead bits may be incorporated into the decoding of the received symbols. In particular, since the overhead bits are conditional upon the information bits, the overhead bits effectively reduce the size of the set of possible transmit optical symbols, which can improve the received bit error rate relative to the case in which the overhead bits are isolated.

The embodiments of the invention described above are intended to be illustrative only. The scope of the invention is therefore intended to be limited solely by the scope of the appended claims.

We claim:

1. A method of transmitting a data signal using an optical transmitter of an optical communications system, the optical transmitter being configured to modulate an optical carrier in successive sets of signalling intervals to generate an optical signal, the method comprising:
    an encoder optical transmitter encoding the data signal to generate a respective set of symbols to be modulated onto orthogonal polarizations of the optical carrier in two or more signalling intervals, and selecting a value of one or more of the symbols to control at least one of a variance of filtered power doublets and a variance of filtered polarization doublets of the optical signal; and
    a modulator of the optical transmitter modulating the orthogonal polarizations of the optical carrier in accordance with the respective sequence of symbols to generate an optical signal for transmission through the optical communications system.

2. The method of claim 1, wherein at least one of the symbols modulated onto the carrier in the two or more signalling intervals comprises at least one overhead bit, and wherein selecting a value of one or more of the symbols comprises selecting a value of the at least one overhead bit.

3. The method of claim 1, wherein selecting a value of one or more of the symbols comprises selecting a value of one or more of the symbols so as to minimize a function of the variances of filtered power doublets and filtered polarization doublets.

4. The method of claim 1, wherein the filtered power doublets and the filtered polarization doublets are filtered using a set of predetermined filter coefficients that quantify nonlinear interactions between pairs of optical channels in the optical communications system.

5. The method of claim 1, wherein selecting a value of one or more of the symbols comprises selecting a value of one or more of the symbols such that the respective sign of a first polarization doublet in a first signalling interval is opposite that of a second polarization doublet in a second signalling interval.

6. The method of claim 2, wherein the overhead bits are grouped together in one of the symbols.

7. The method of claim 2, wherein the overhead bits are distributed across both of the X- and Y-polarizations.

8. The method of claim 2, wherein the overhead bits are distributed across both of the first and second signalling intervals.

9. The method of claim 2, further comprising selecting a value of at least one overhead bit such that a power variation of the optical signal is minimized.

10. The method of claim 2 further comprising a receiver recovering the data signal using one or more of the overhead bits.

11. An optical transmitter of an optical communications system, the optical transmitter being configured to modulate an optical carrier in successive sets of signalling intervals to generate an optical signal for transmission trough the optical communications system, the optical transmitter comprising:
    an encoder of the optical transmitter configured to encode the data signal to generate a respective set of symbols to be modulated onto orthogonal polarizations of the optical carrier in two or more signalling intervals, and configured to select a value of one or more of the symbols to control at least one of a variance of filtered power doublets and a variance of filtered polarization doublets of the optical signal; and
    a modulator configured to modulate the orthogonal polarizations of the optical carrier in accordance with the respective sequence of symbols to generate the optical signal.

12. The optical transmitter of claim 11, wherein at least one of the symbols modulated onto the carrier in the two or more signalling intervals comprises at least one overhead bit, and wherein selection of a value of one or more of the symbols comprises selection of a value of the at least one overhead bit.

13. The optical transmitter of claim 11 wherein selection of a value of one or more of the symbols comprises selection of a value of one or more of the symbols so as to minimize a function of the variances of filtered power doublets and filtered polarization doublets.

14. The optical transmitter of claim 13 wherein the filtered power doublets and the filtered polarization doublets, respectively, are filtered using a set of predetermined filter coefficients that quantify nonlinear interactions between pairs optical channels in the optical system.

15. The optical transmitter of claim 11, wherein selection of a value of one or more of the symbols comprises selection of a value of one or more of the symbols such that the respective sign of a first polarization doublet in a first signalling interval is opposite that of a second polarization doublet in a second signalling interval.

16. The optical transmitter of claim 12, wherein the overhead bits are grouped together in one of the symbols.

17. The optical transmitter of claim 12, wherein the overhead bits are distributed across both of the X- and Y-polarizations.

18. The optical transmitter of claim 12, wherein the overhead bits are distributed across both of the first and second signalling intervals.

19. The optical transmitter of claim 12, wherein the encoder is further configured to select a value of at least one overhead bit such that a power variation of the optical signal is minimized.

20. An optical communications system comprising:
    an optical transmitter configured to modulate an optical carrier in successive sets of signalling intervals to generate an optical signal for transmission trough the optical communications system, the optical transmitter including: an encoder of the configured to encode the data signal to generate a respective set of symbols to be modulated onto orthogonal polarizations of the optical carrier in two or more signalling intervals, and configured to select a value of one or more of the symbols to control at least one of a variance of filtered power doublets and a variance of filtered polarization doublets of the optical signal, and a modulator configured to modulate the orthogonal polarizations of the optical carrier in accordance with the respective sequence of symbols to generate the optical signal; and
    a receiver configured to recover the data signal using one or more of the overhead bits.

* * * * *